Aug. 19, 1941.   C. W. MARKLEY   2,253,469
RECEPTACLE
Filed Oct. 19, 1939

Charles W. Markley
INVENTOR
BY Victor J. Evans & Co.
ATTORNEYS

Patented Aug. 19, 1941

2,253,469

UNITED STATES PATENT OFFICE 2,253,469

RECEPTACLE

Charles W. Markley, Brush, Colo.

Application October 19, 1939, Serial No. 300,271

2 Claims. (Cl. 47—38)

My invention relates to improvements in self-watering flower pots and the like and has as one of the principal objects thereof the provision of a flower pot equipped with means whereby the soil or sand contained therein is irrigated from a self-contained reservoir.

Another object of my invention is to provide a device of the above described character, which is simple in construction, durable in use, efficient in operation, and economical in manufacture.

Other objects and advantages will be apparent from the following description, appended claims and annexed drawing.

Referring to the drawing wherein like reference characters designate like parts throughout the several views.

Figure 1:
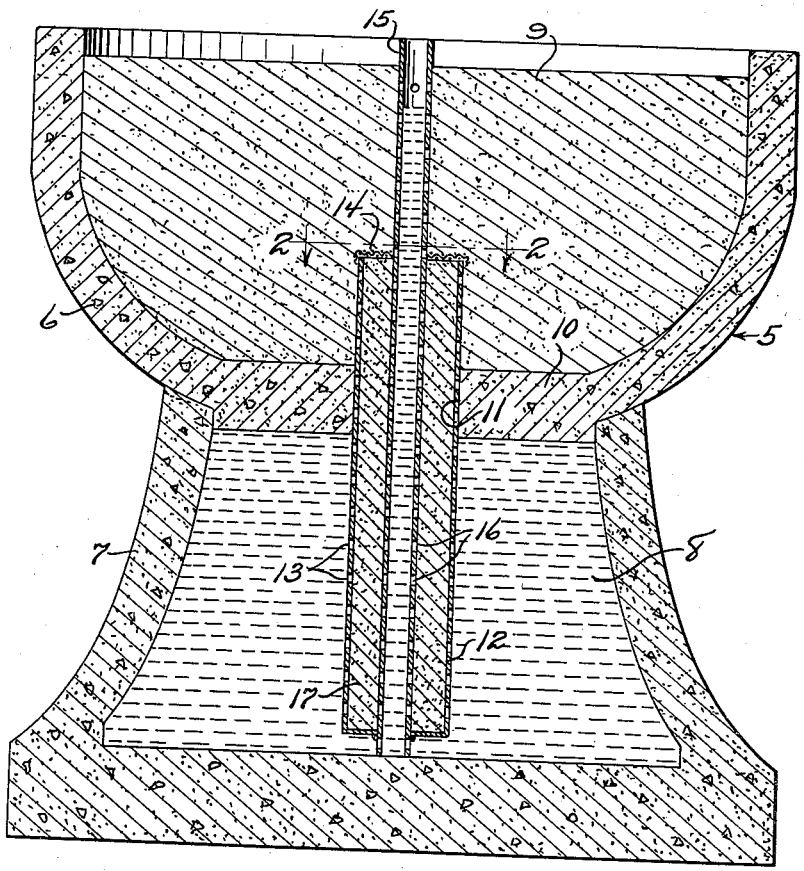
Figure 1 is a vertical sectional view of my invention.
Figure 2:
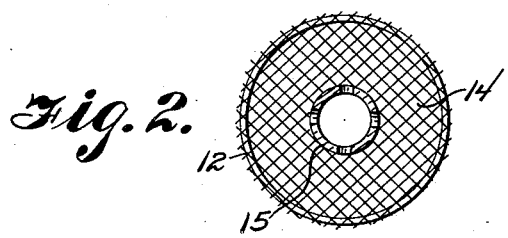
Figure 2 is a sectional view taken on the line 2—2 of Figure 1.

In practicing my invention, as illustrated in the drawing, I employ a flower pot or urn 5 having upper and lower detachable sections 6 and 7 respectively. The lower section constitutes a reservoir 8 and on which is mounted the upper section 6 containing therein soil or sand 9 in which are planted flowers or the like (not shown). The upper section 6 is fashioned with a bottom wall 10 supported on the upper portion of the lower section 7 and said wall is fashioned with a centrally disposed opening 11 through which extends a hollow perforated member or cylinder 12, said perforations being indicated by the numeral 13.

The lower end of the tube 12 is closed and is disposed in proximity to the bottom of the reservoir. The upper end of the tube 12 terminates an appreciable distance above the bottom wall 10 of the upper section and is closed by a screen or latticed disk 14. Disposed centrally within the cylinder 12 and extending therethrough is a tube 15, the sides of which are provided with perforations 16. The upper end of the tube 15 extends an appreciable distance beyond the disk 14 and terminates in a plane defining the top edge of the upper section 6. The lower end of the tube 15 is closed by the bottom wall of the reservoir 8.

The cylinder 12 is provided with soil or sand 17 which surrounds the tube 15 therein and serves to feed liquid, for instance water or a nutrient solution, from the reservoir to the soil or sand within the upper section 6. The water or nutrient solution in said reservoir is introduced therein through the upper end of the tube 15 and water or nutrient solution thus introduced is fed to the soil or sand 9 and 17 through the perforated openings 13 and 16 during the filling of the reservoir and at all times thereafter so long as any water or nutrient solution remains in the reservoir.

From the foregoing, it will be apparent that I have provided a simple and efficient device which serves to irrigate and/or nourish the soil or sand contained therein whereby to promote the growth of plants and the like.

Furthermore, it will be noted that my invention is so constructed and arranged that it enables me to utilize soil or sand as a means for feeding the water or nutrient solution from the reservoir into the soil or sand of the upper section thus eliminating cloth wicks or the like usually employed in devices of ordinary construction. It is to be understood that the term "soil" is to be comprehended in its broadest scope and to include sand or finely pulverized particles.

It is also obvious that the invention is not confined to the herein described use therefor as it may be utilized for any purpose to which it is adaptable. It is therefore to be distinctly understood that the invention is not limited to the specific construction as illustrated and described, as the same is only illustrative of the principles of operation, which are capable of extended application in advance forms, and that the invention comprehends all construction within the scope of the appended claims.

What I claim is:

1. A device of the character described, comprising, a plant container having upper and lower sections and adapted to contain soil and liquid respectively, a tube extending through said sections for supplying liquid to said lower section, a member arranged about and supported by said tube and extending into both of said sections and containing soil for feeding liquid from said lower section to the soil in said upper section independently of said tube.

2. A device of the character described, comprising, a plant container having upper and lower sections and adapted to contain soil and liquid respectively, a tube extending through said sections for supplying liquid to said lower section, a member arranged about and supported by said tube and extending into both of said sections and containing soil for feeding liquid from said lower section to the soil in said upper section independently of said tube, said tube formed with perforations for irrigating the soil contained in said upper section during the filling of said lower section with liquid.

CHARLES W. MARKLEY.